(12) United States Patent
Tutt

(10) Patent No.: US 6,776,446 B1
(45) Date of Patent: Aug. 17, 2004

(54) SUN VISOR ASSEMBLY FOR VEHICLES

(76) Inventor: Charles M. Tutt, P.O. Box 1005, Water Mill, NY (US) 11976

( * ) Notice: Subject to any disclaimer, the term of this patent is extended or adjusted under 35 U.S.C. 154(b) by 0 days.

(21) Appl. No.: 10/746,716

(22) Filed: Dec. 29, 2003

(51) Int. Cl.$^7$ .................................................. B60J 3/02
(52) U.S. Cl. .................................... 296/97.11; 296/97.8
(58) Field of Search ................................ 296/97.1, 97.4, 296/97.5, 97.8, 97.9, 97.11, 97.12, 97.13

(56) References Cited

U.S. PATENT DOCUMENTS

| | | | | |
|---|---|---|---|---|
| 1,599,183 A | * | 9/1926 | Phillips | 296/97.13 |
| 2,596,873 A | * | 5/1952 | Solmes | 296/97.8 |
| 2,634,161 A | * | 4/1953 | Beets | 296/97.11 |
| 2,678,183 A | * | 5/1954 | Bell | 248/278.1 |
| 2,733,763 A | * | 2/1956 | Nygaard | 160/32 |
| 2,912,275 A | * | 11/1959 | O'Neal | 296/97.13 |
| 2,917,186 A | * | 12/1959 | Beets | 211/97 |
| 2,965,415 A | * | 12/1960 | Dryden | 296/97.13 |
| 2,965,416 A | * | 12/1960 | Dryden | 296/97.8 |
| 2,999,718 A | * | 9/1961 | Handler | 296/97.9 |
| 4,666,205 A | * | 5/1987 | Nakagawa | 296/97.6 |
| 4,792,176 A | * | 12/1988 | Karford | 296/97.8 |
| 4,824,161 A | * | 4/1989 | Lee | 296/97.8 |
| 4,828,314 A | * | 5/1989 | Gavagan | 296/97.8 |
| 5,156,434 A | * | 10/1992 | Vandagriff | 296/97.8 |
| 5,306,065 A | * | 4/1994 | Ades | 296/97.6 |
| 5,316,361 A | * | 5/1994 | Miller | 296/97.8 |
| 5,445,427 A | * | 8/1995 | Vandagriff | 296/97.6 |
| 5,472,255 A | * | 12/1995 | Moore | 296/97.6 |
| 5,513,892 A | * | 5/1996 | Thomas | 296/97.2 |
| 5,580,117 A | * | 12/1996 | Goclowski | 296/97.6 |
| 6,460,593 B1 | * | 10/2002 | Floyd | 160/370.22 |

* cited by examiner

Primary Examiner—D. Glenn Dayoan
Assistant Examiner—H. Gutman
(74) Attorney, Agent, or Firm—Donald A. Kettlestrings

(57) ABSTRACT

A sun visor assembly for attachment to a preexisting sun visor mounting rod of a vehicle. The assembly includes a first portion for shielding the windshield having four overlapping panels vertically and laterally adjustable with respect to each other. The assembly further includes a second portion rotatably positionable with respect to the first portion for shielding the vehicle's side window. The second portion includes four additional overlapping panels vertically and laterally adjustable with respect to each other. Each of the first and second portions are universally rotatably positionable for deployment beside the windshield and side window, respectively, when in use and for deployment in a compact stored position away from the windshield and side window when not in use.

45 Claims, 15 Drawing Sheets

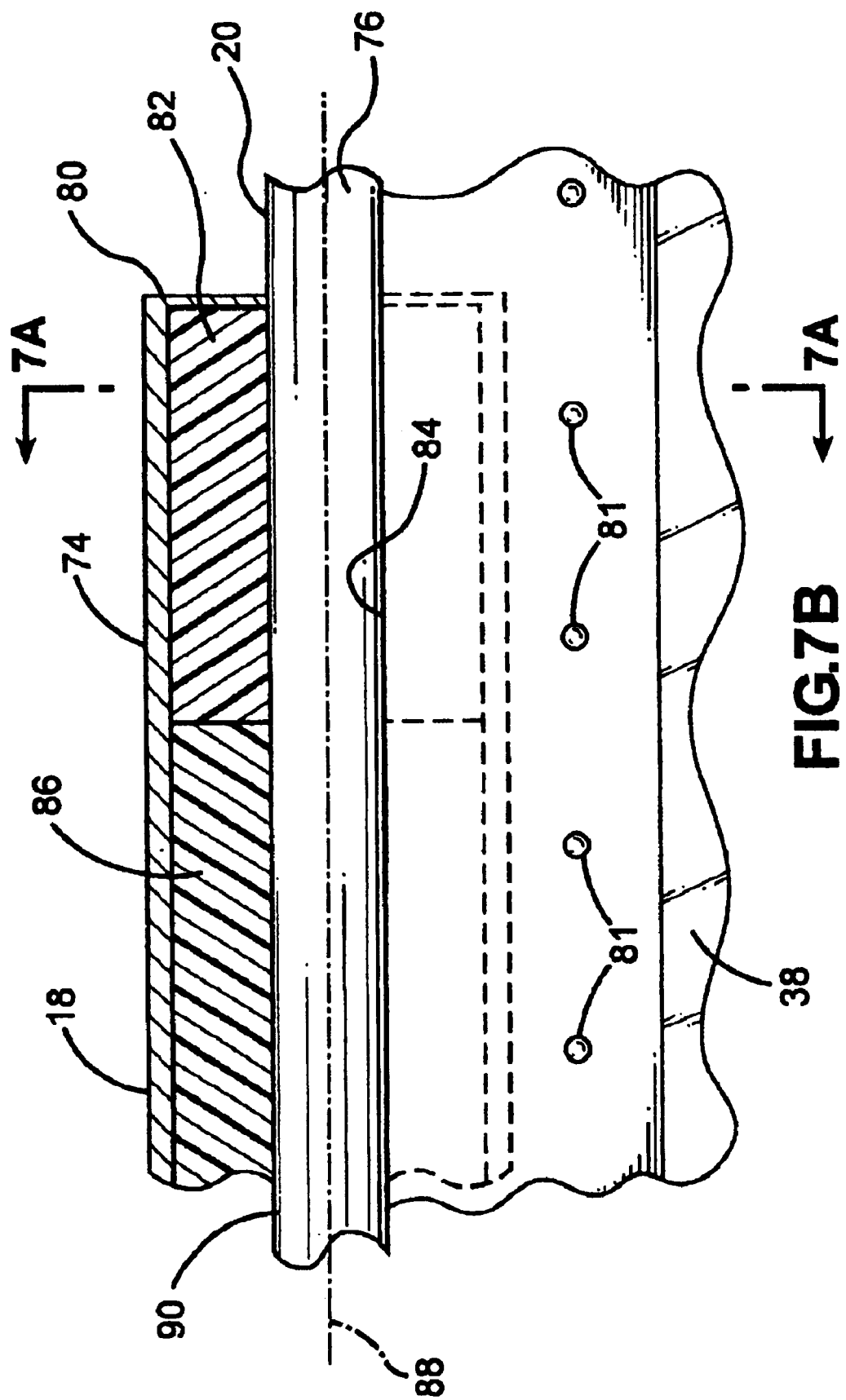

SUN VISOR ASSEMBLY FOR VEHICLES

BACKGROUND OF THE INVENTION

This invention relates to sun visors for vehicles and more particularly to a sun visor assembly for attachment to a preexisting sun visor mounting rod of a vehicle or for factory installation. The assembly preferably includes eight separate panels which are vertically and laterally adjustably positioned with respect to the vehicle's windows and with respect to each other for providing optimum sun shading for the vehicle's occupants with respect to the front windshield and side window of the vehicle. The assembly is universally pivotable for selectively positioning the panels in sun-shielding and stored positions and for providing optimum sun-shielding positioning of the panels.

Various types of sun visor assemblies for shielding the eyes of vehicle drivers and passengers from the sun's rays are well known. Although such devices have served the purpose, they have not proved entirely satisfactory under all conditions of service because they have not always provided the optimum shielding of the sun's rays.

It is, therefore, an object of the present invention to provide a sun visor assembly for attachment to a preexisting sun visor mounting rod of a vehicle.

Another object is to provide a sun visor assembly for factory installation to a vehicle.

Another object is to provide such an assembly which can be adjusted vertically and laterally to simultaneously provide optimum sun blockage for both the windshield and the side window of a vehicle.

A further object of the invention is the provision of such an assembly which can be rotated to positions away from the windshield and/or the side window of the vehicle when not in use.

Still another object is to provide such an assembly which preferably includes eight panels vertically and laterally positionable with respect to each other to provide optimal sun blockage for the windshield and side window of a vehicle.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects, the present invention provides a sun visor assembly for attachment to a sun visor mounting rod of a vehicle, which assembly includes eight shielding panels vertically and laterally adjustable with respect to each other for providing optimal sun shielding for the windshield and side window of the vehicle.

It is to be understood that both the foregoing general description and the following detailed description are exemplary and explanatory but are not restrictive of the invention.

BRIEF DESCRIPTION OF THE SEVERAL VIEWS OF THE DRAWINGS

The accompanying drawings, which are incorporated in and constitute a part of this specification, illustrate a preferred embodiment of the invention and, together with the description, serve to explain the principles of the invention.

FIG. 7B is a fragmentary view, partly in section, showing details of the interrelated structure of tube 74 and rod 76;

DETAILED DESCRIPTION OF THE INVENTION

Figure 1:
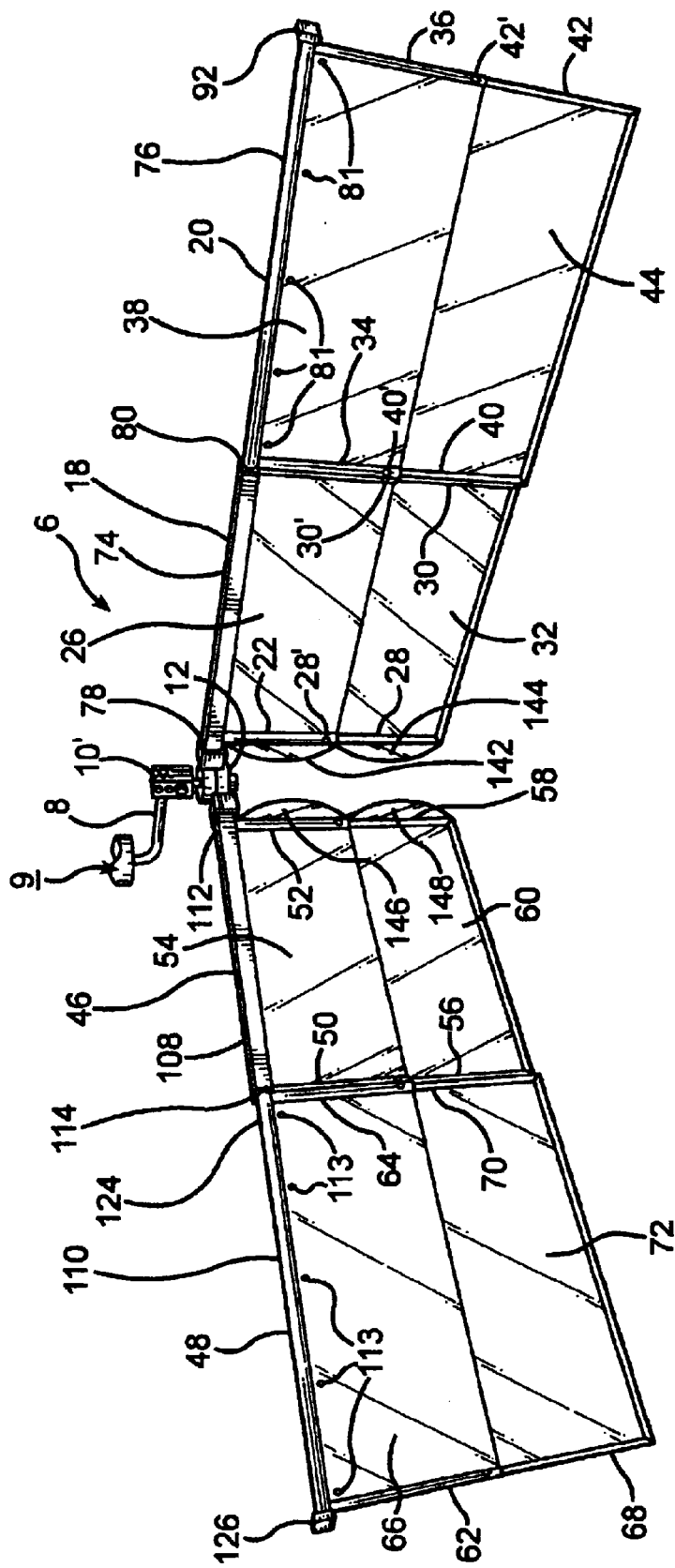
FIG. 1 is a fragmentary perspective view showing the sun visor assembly mounted on the driver's side of a vehicle.
Figure 2:
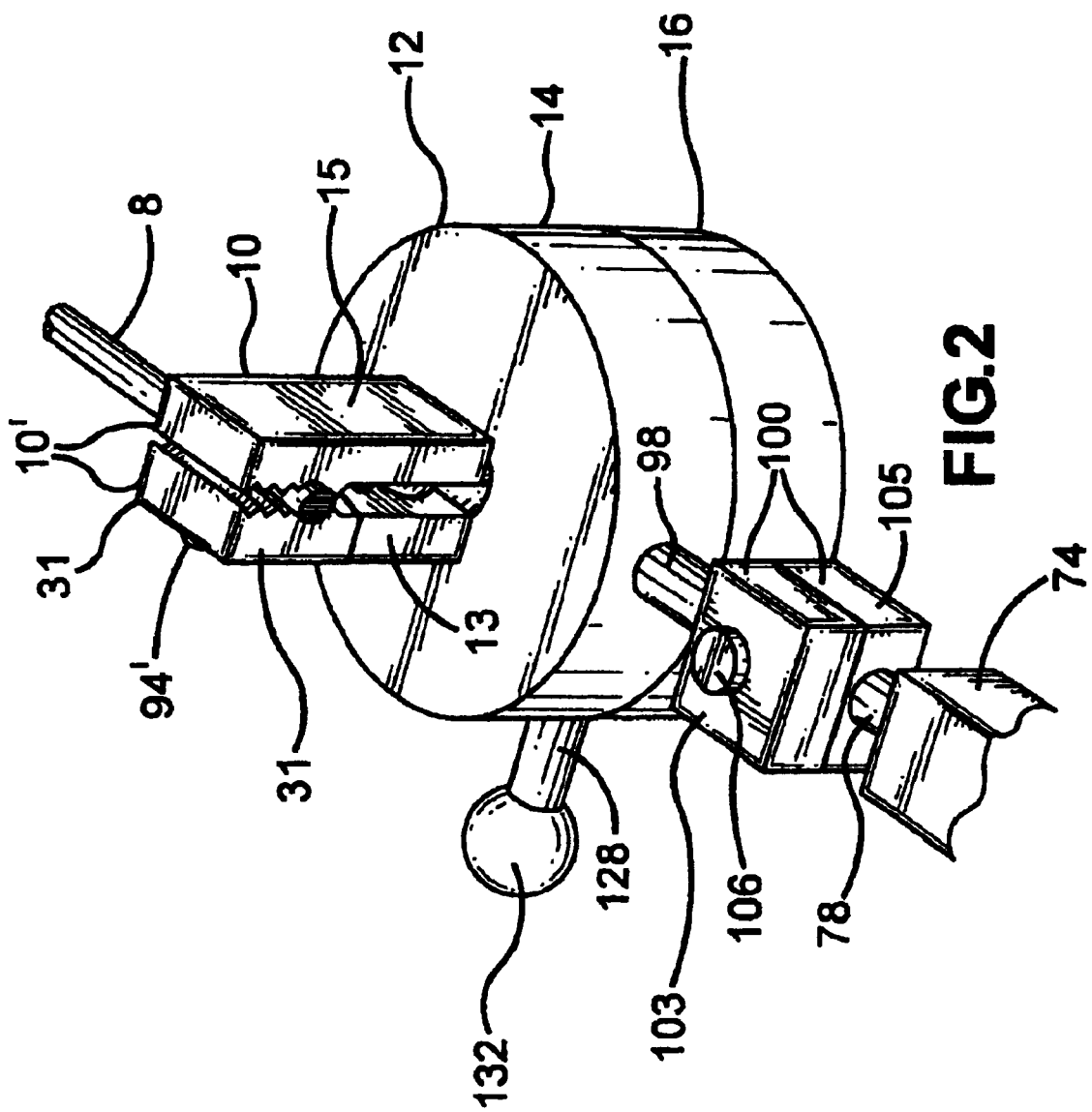
FIG. 2 is a fragmentary perspective view of the swivel portion of the assembly.
Figure 3:
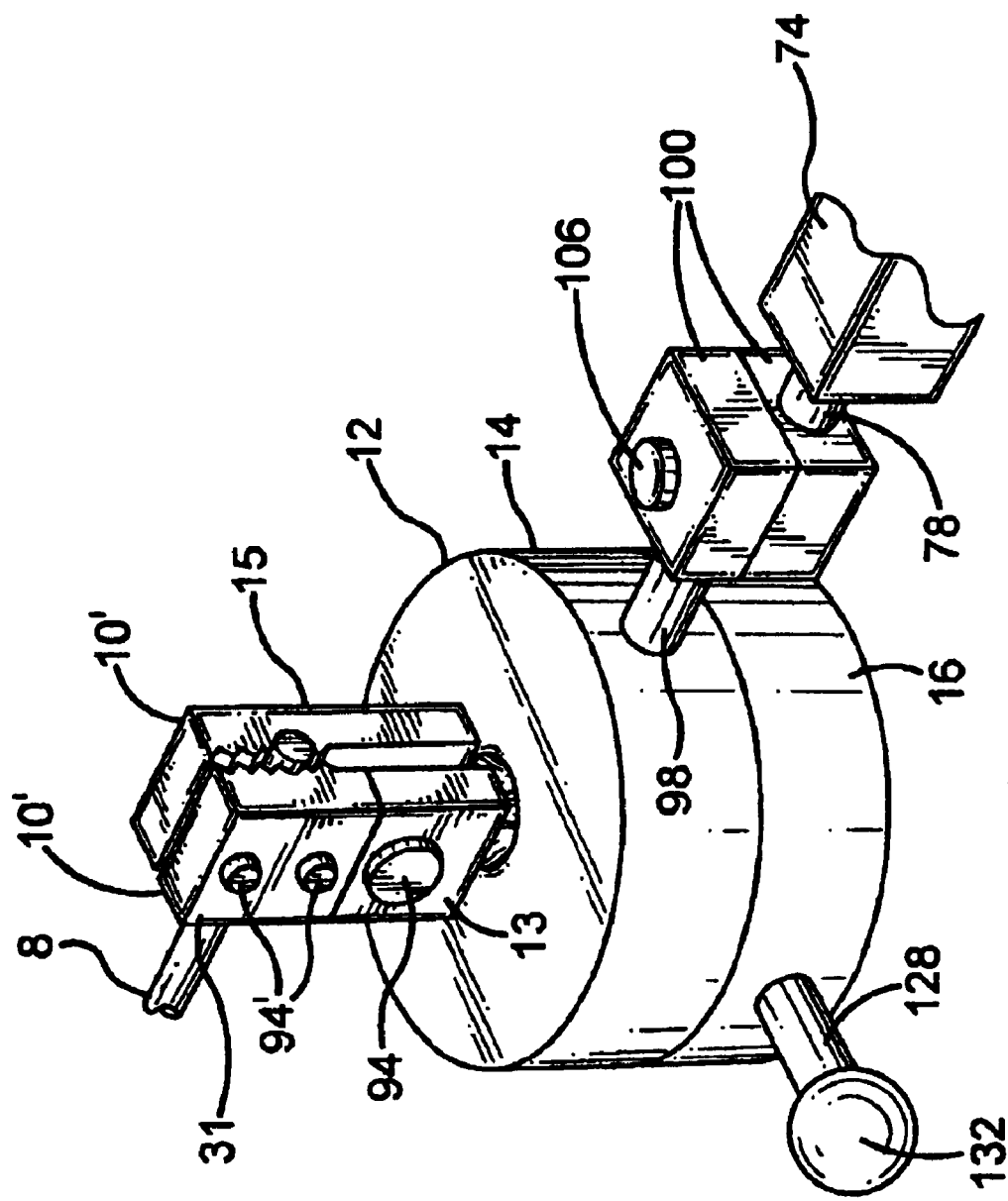
FIG. 3 is an additional fragmentary view of the swivel portion of the assembly.
Figure 4:
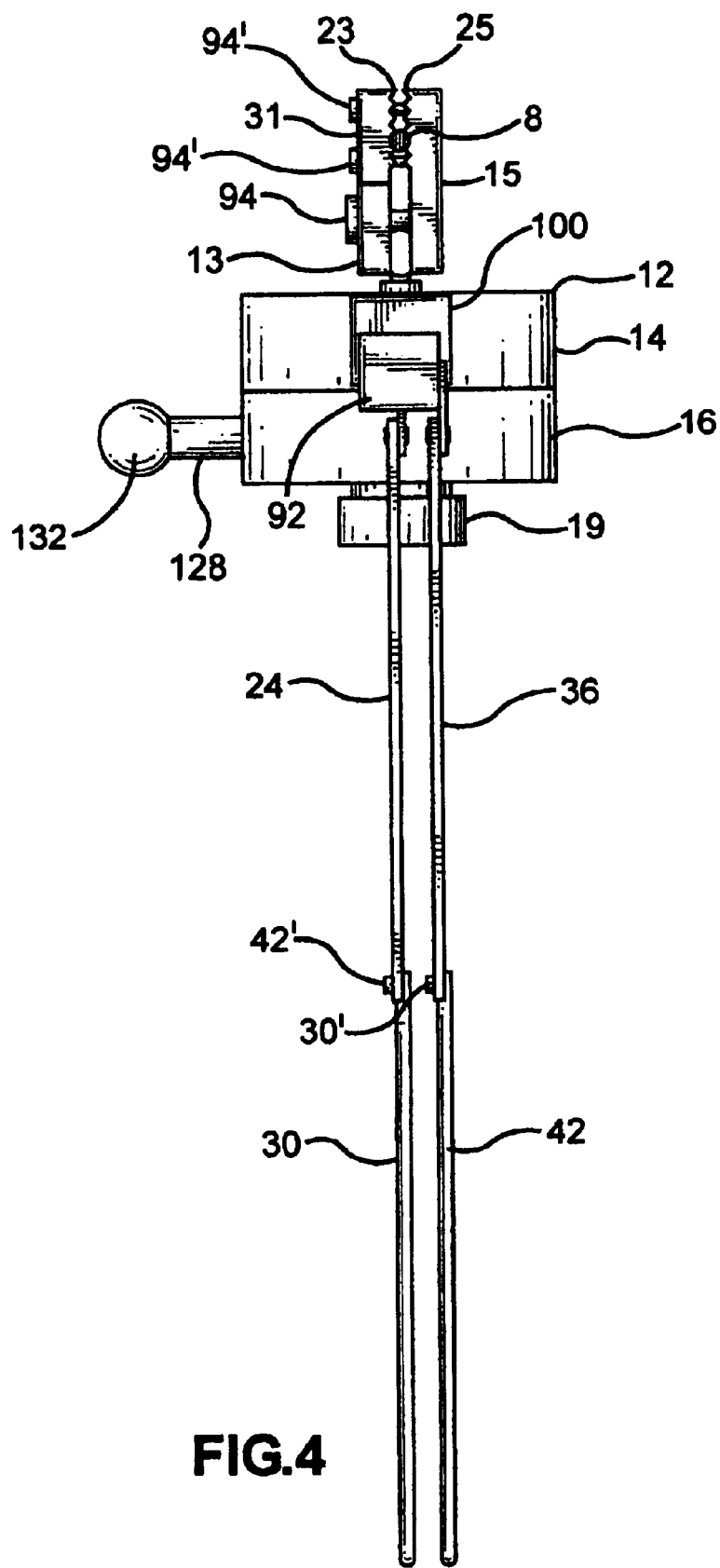
FIG. 4 is an end elevation view of the assembly.
Figure 5:
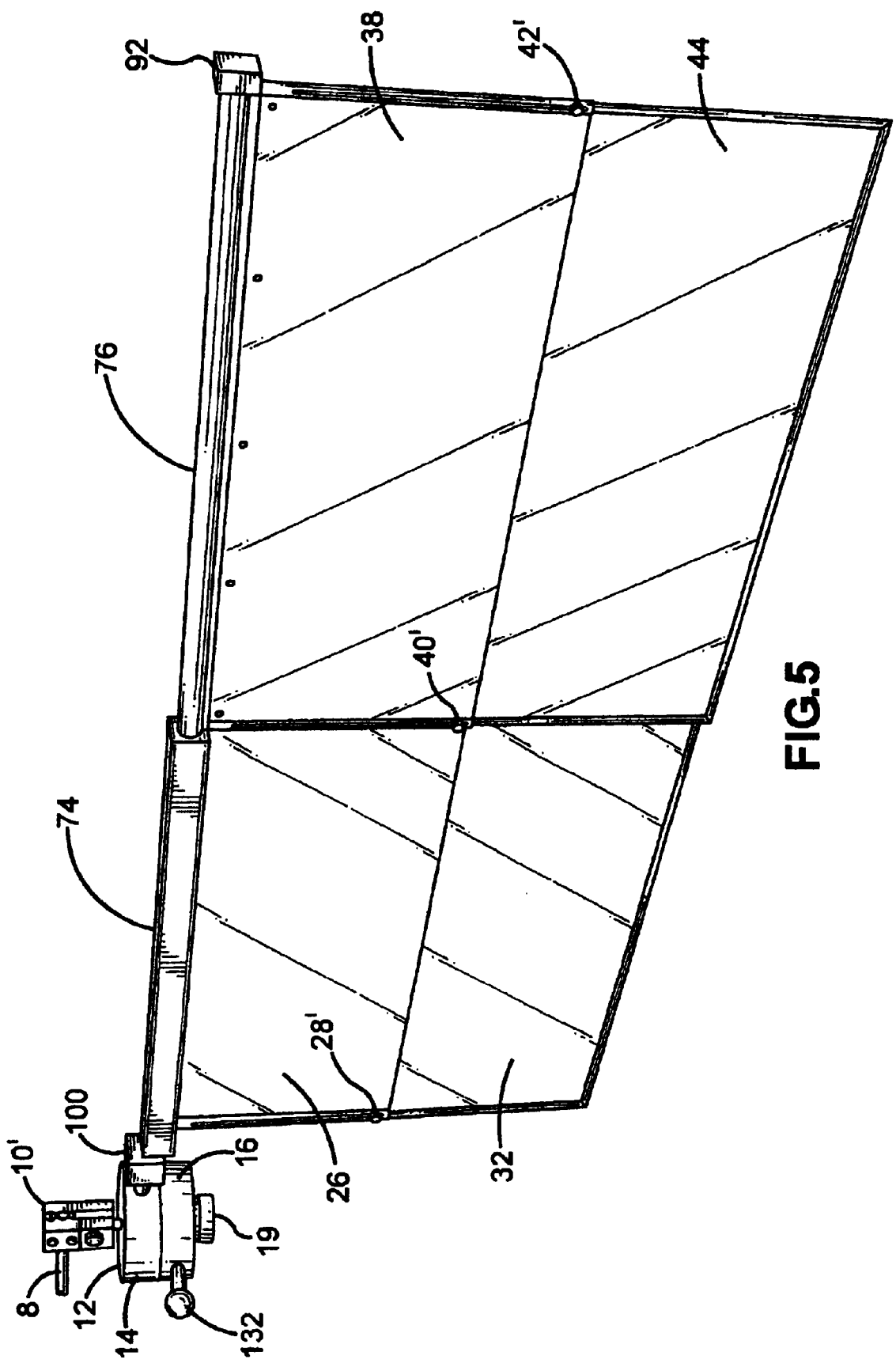
FIG. 5 is a fragmentary perspective view of the portion of the assembly used primarily for screening the vehicle's windshield.
Figure 6:
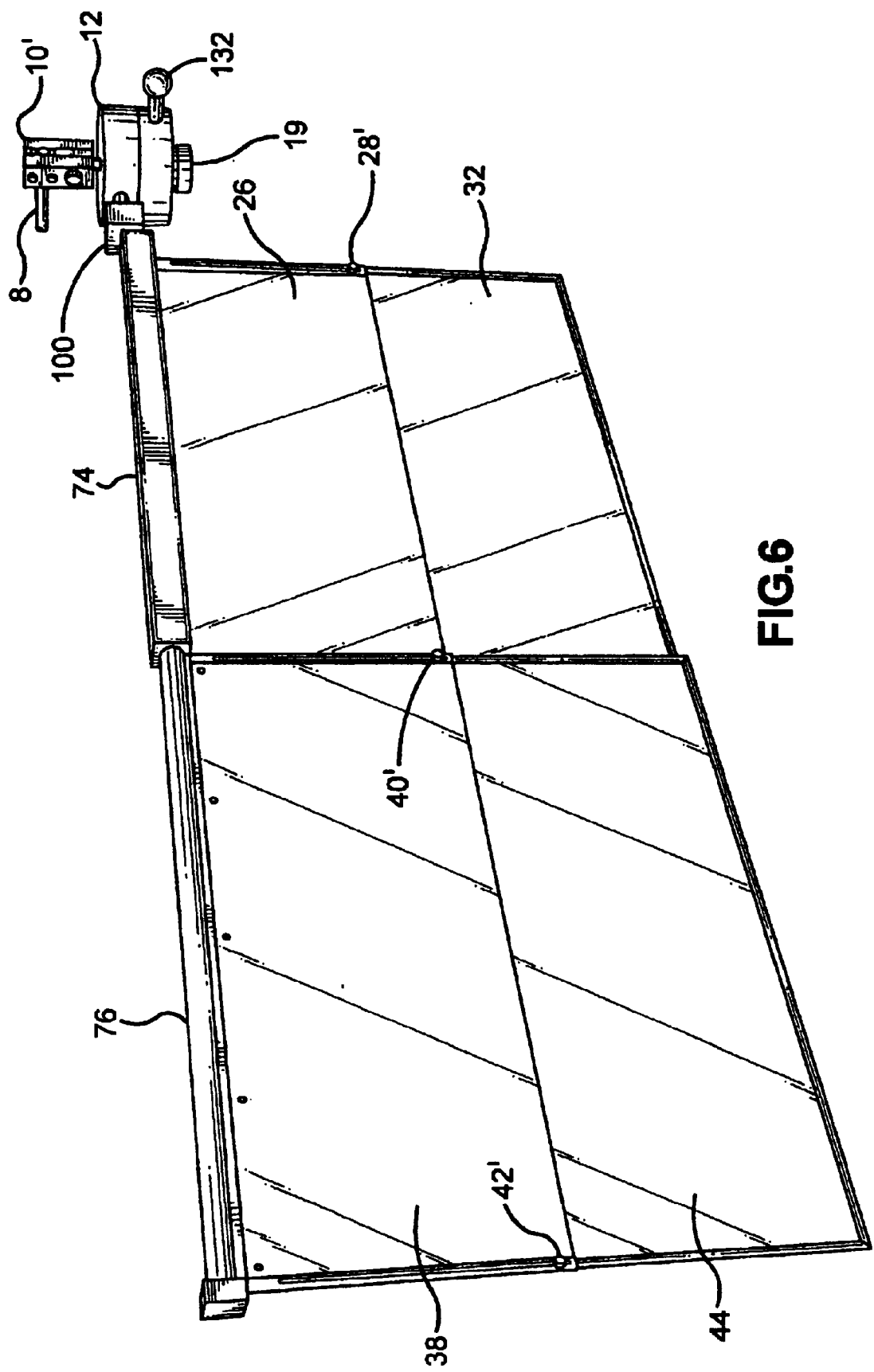
FIG. 6 is an additional fragmentary perspective view of the portion of the assembly used primarily for screening the vehicle's windshield.
Figure 7A:
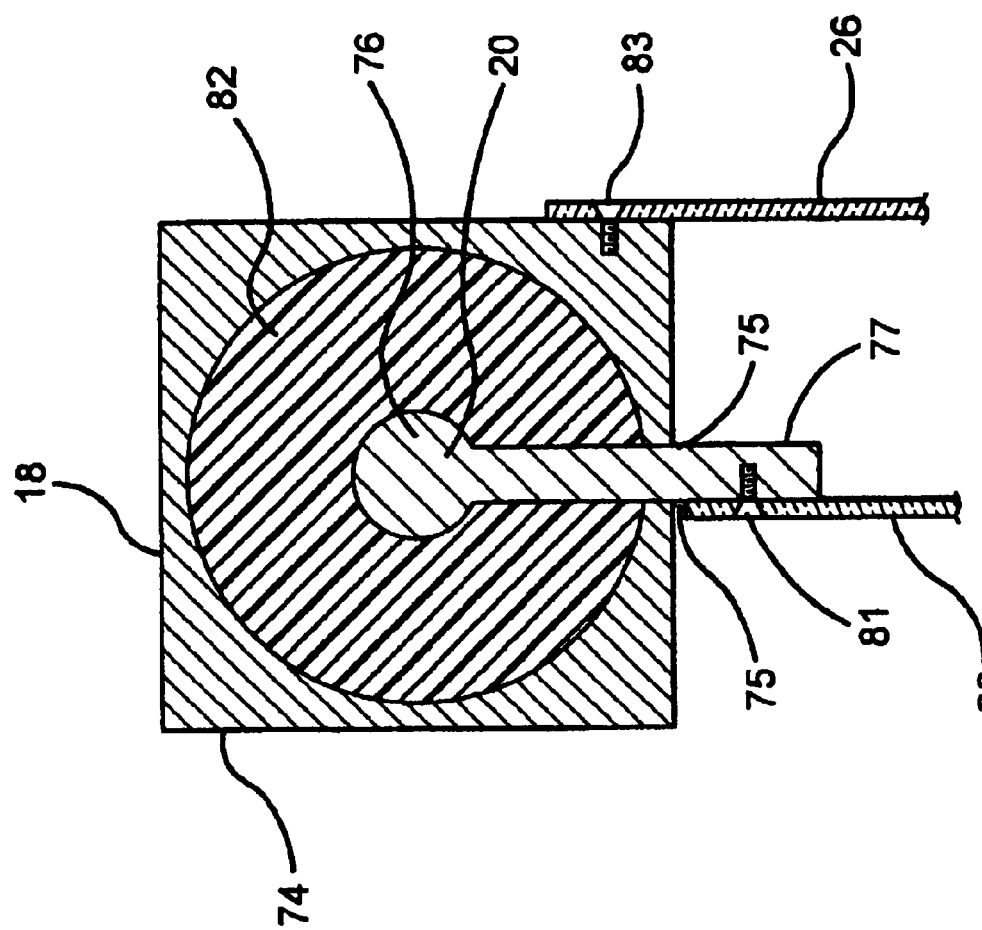
FIG. 7A is a cross-sectional view taken along the line 7A—7A in FIG. 7B and looking in the direction of the arrows.
Figure 8A:
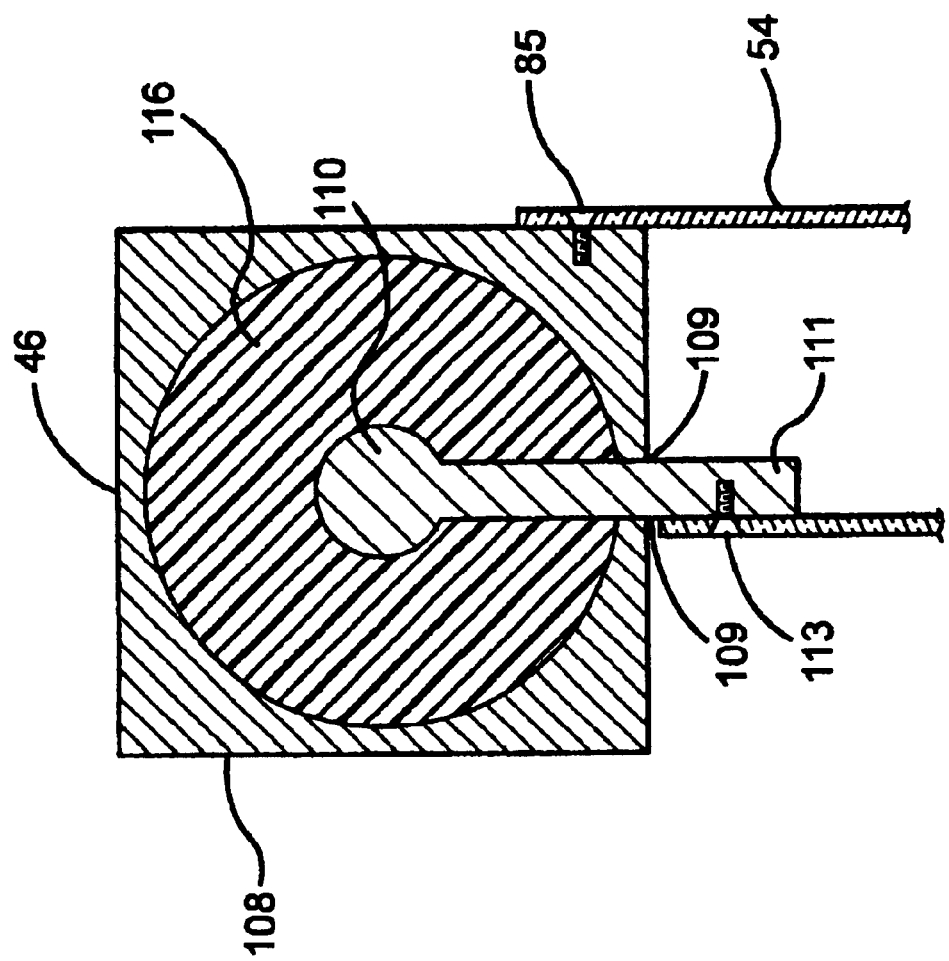
FIG. 8A is a cross-sectional view taken along the line 8A—8A in FIG. 8B and looking in the direction of the arrows.
Figure 8B:
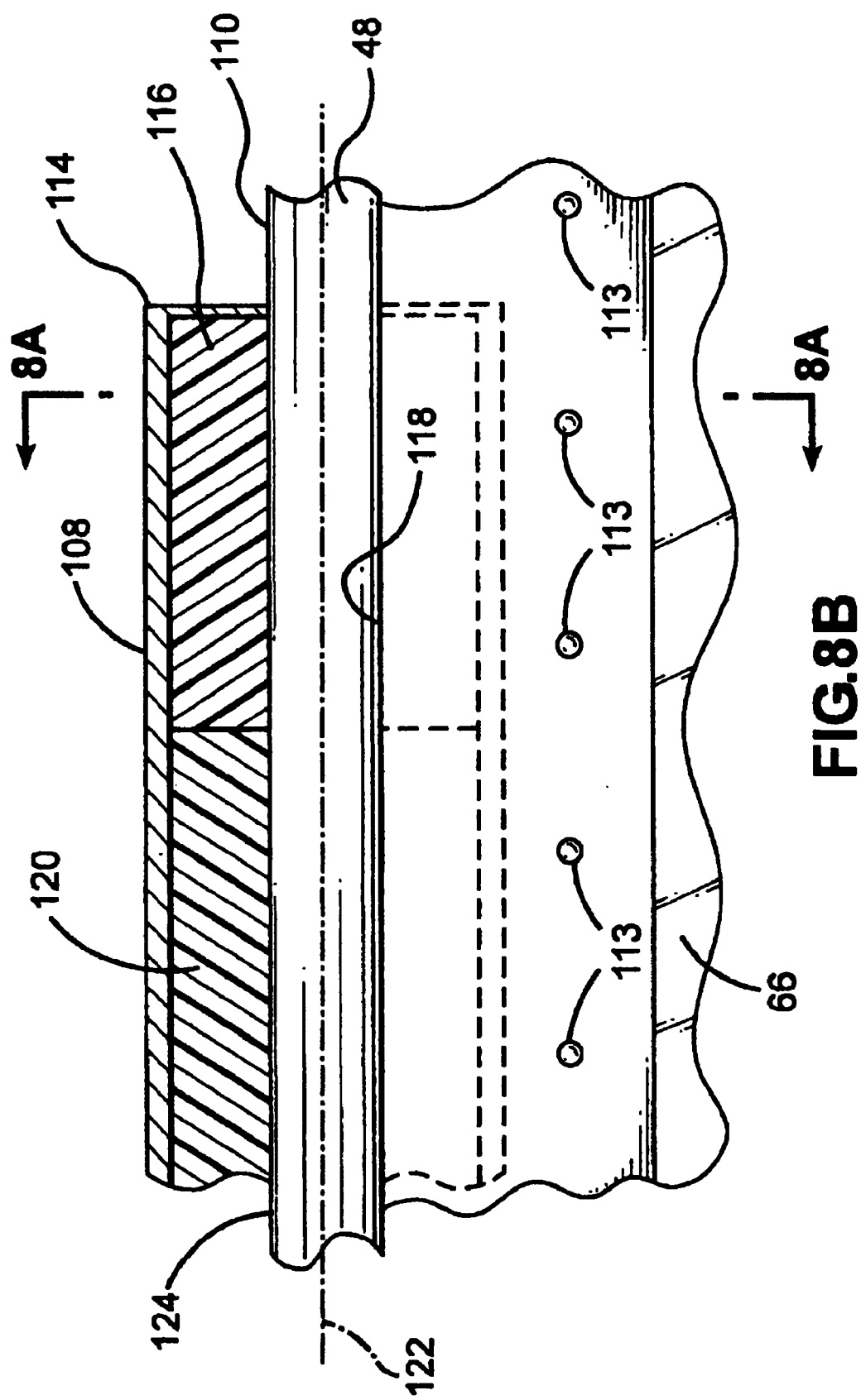
FIG. 8B is a fragmentary view, partly in section, showing details of the interrelated structure of tube 108 and rod 110.
Figure 9:
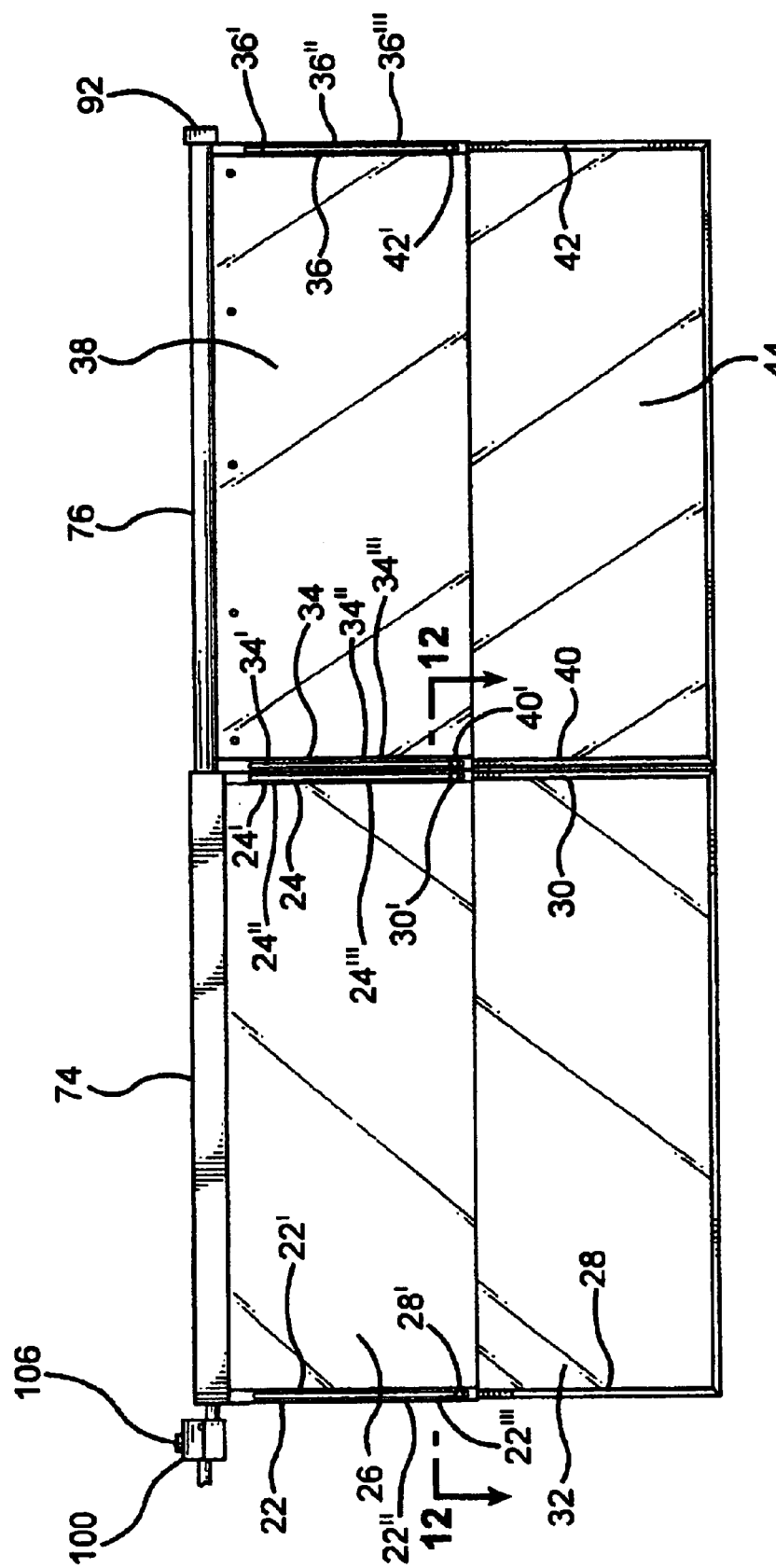
FIG. 9 is a fragmentary side elevation view showing the portion of the assembly used primarily for screening the vehicle's windshield.
Figure 10:
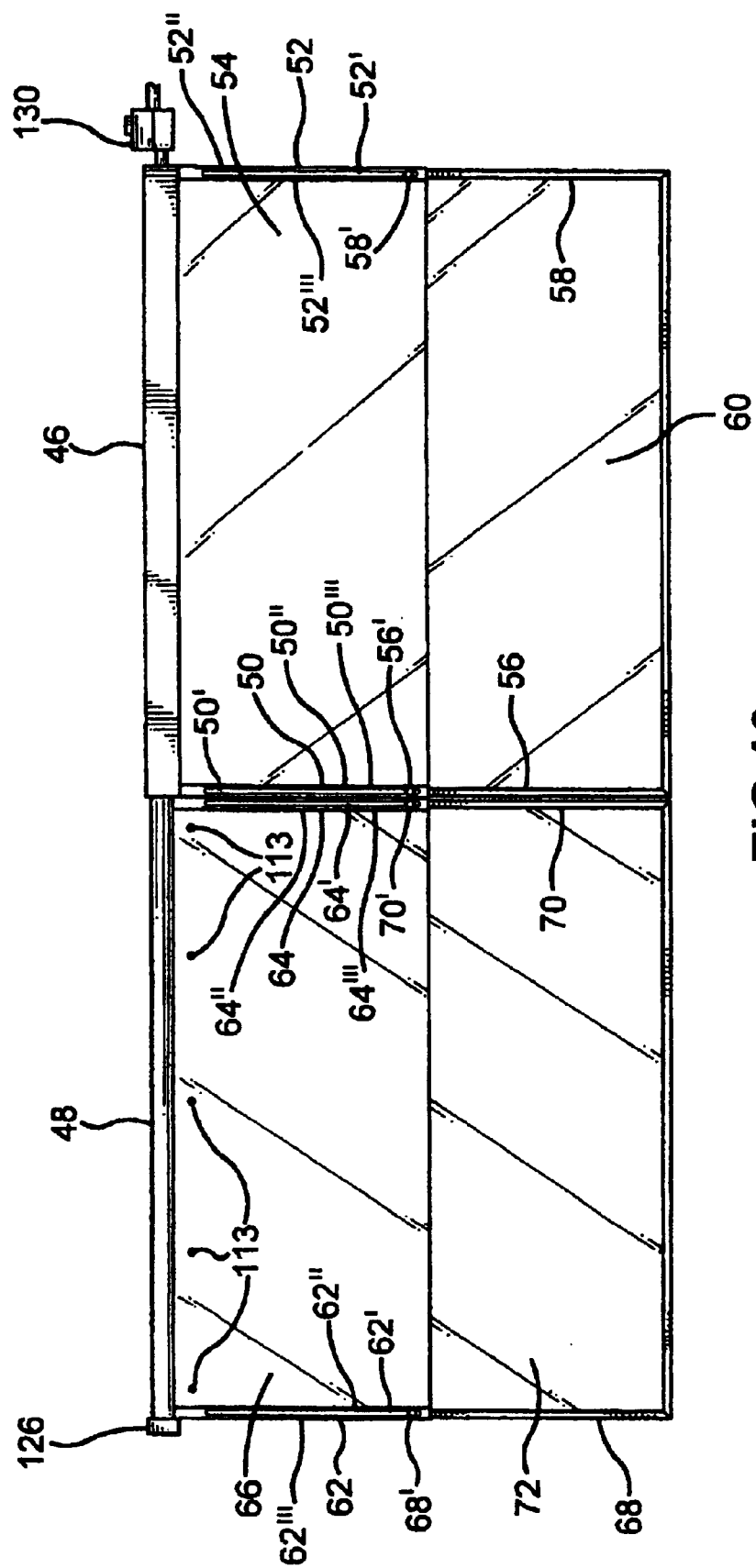
FIG. 10 is a fragmentary side elevation view showing the portion of the assembly used primarily for screening the driver's side window.
Figure 11:
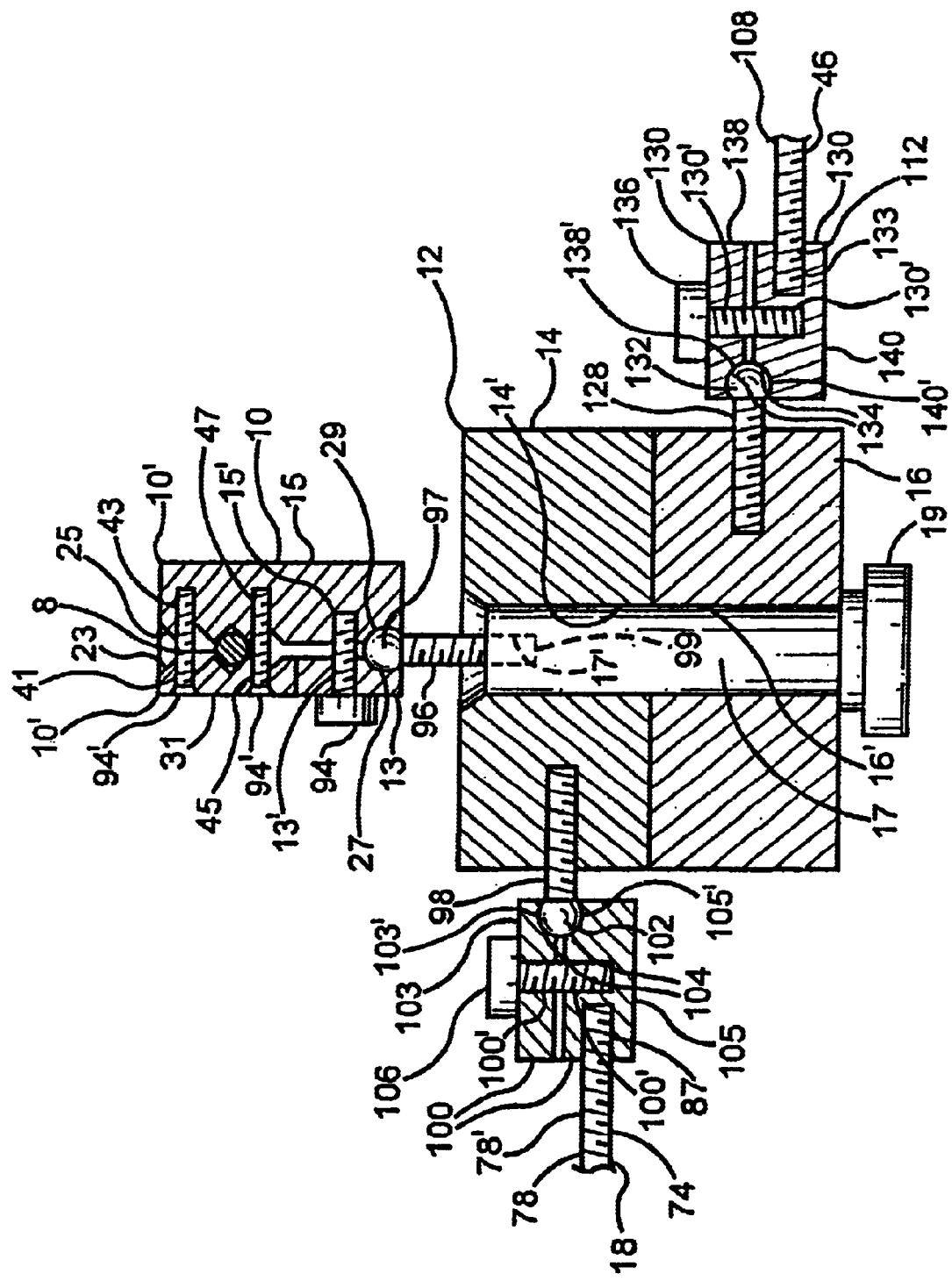
FIG. 11 is a fragmentary cross-sectional view showing the clamp and swivel of the assembly.
Figure 12:
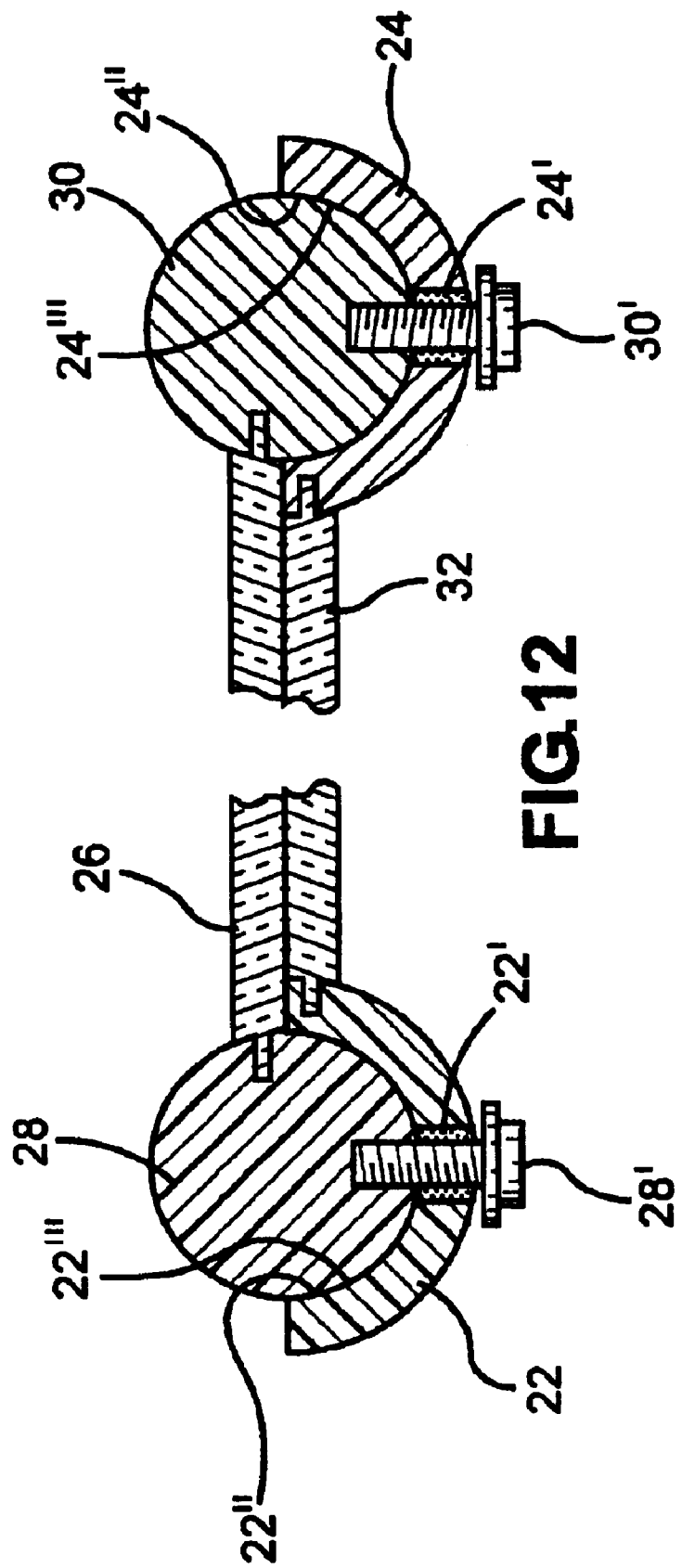
FIG. 12 is a fragmentary cross-sectional view taken along the line 12—12 in FIG. 9 and looking in the direction of the arrows.
Figure 13:
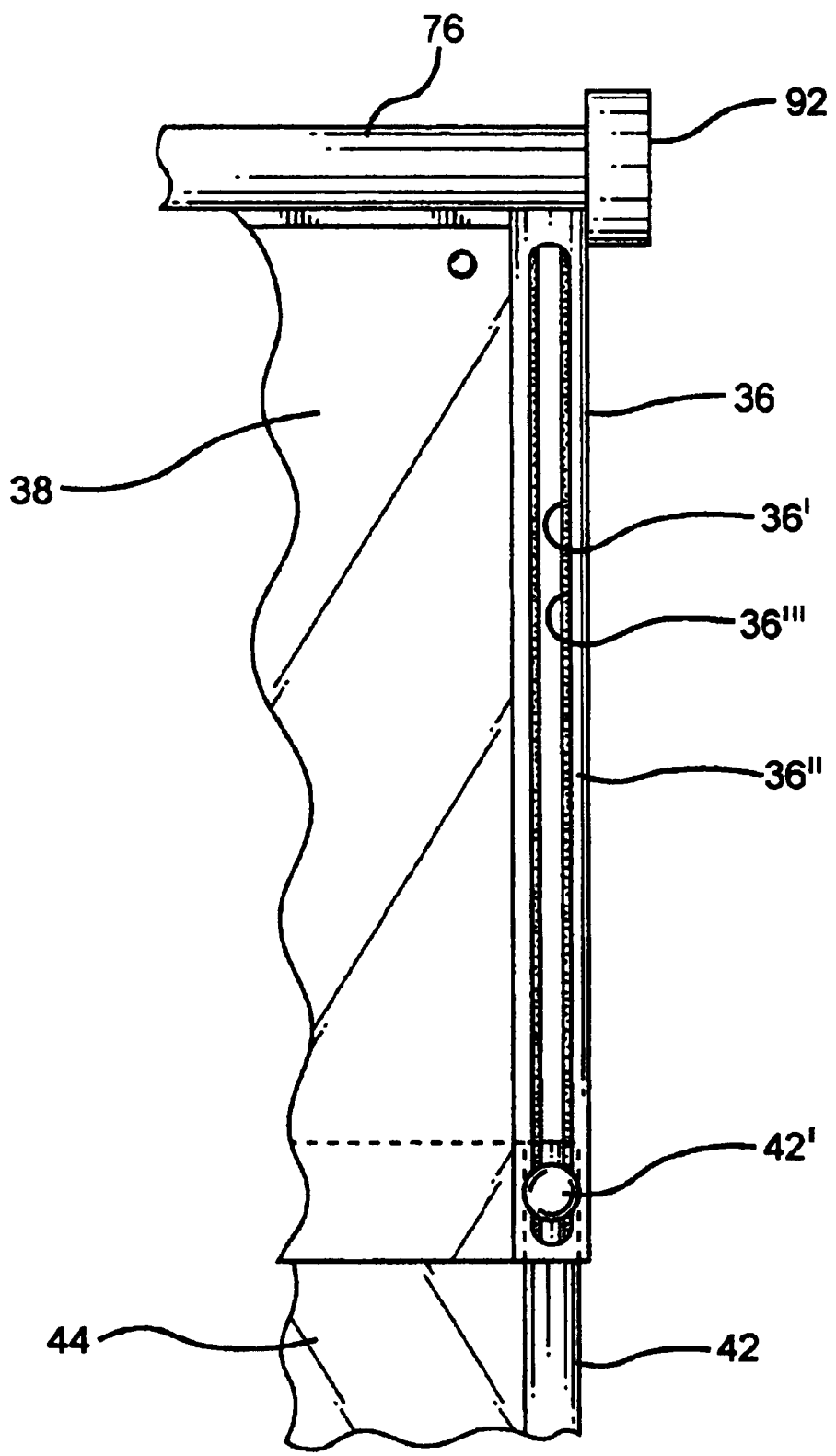
FIG. 13 is a fragmentary side elevation view showing a portion of the assembly used primarily for screening the windshield.

With reference now to the drawings, wherein like reference characters designate like or corresponding parts throughout the several views, there is shown a sun visor assembly 6 for attachment to a sun visor mounting rod 8 conventionally attached to a vehicle 9. In accordance with the invention, assembly 6 includes a first fastener 10 for attachment to mounting rod 8. A swivel assembly 12 is connected to first fastener 10 by first connecting element 96. Swivel assembly 12 includes first 14 and second 16 members. A bolt 17 connects members 14, 16 together through openings 14', 16', respectively, and enables member 16 to be rotated around the longitudinal axis of bolt 17 with respect to first member 14. A nut 19 preferably threadably engages bolt 17 adjacent to second member 16.

A first support 18 is connected to first member 14 by means of second connecting element 98 and third connecting element 100. A second support 20 is movably connected to first support 18, and first 22 and second 24 substantially parallel arm members or molded guide members are connected to and extend from first support 18.

A first substantially planar panel 26 extends between and is connected to first 22 and second 24 arm members or molded guide members in a conventional manner. Third 28 and fourth 30 arm members or molded guide members are slidably connected to first 22 and second 24 arm members, respectively.

A second substantially planar panel 32 extends between and is connected to third 28 and fourth 30 arm members in a conventional manner. Fifth 34 and sixth 36 substantially parallel arm members or molded guide members are connected to and extend from second support 20. A third substantially planar panel 38 extends between and is conventionally connected to fifth 34 and sixth 36 arm members. Seventh 40 and eighth 42 arm members or molded guide members are slidably connected to fifth 34 and sixth 36 arm members, respectively, and a fourth substantially planar panel 44 extends between and is conventionally connected to seventh 40 and eighth 42 arm members.

Further in accordance with the invention, assembly 6 includes a third support 46 connected to second member 16 by fourth connecting element 128 and fifth connecting element 130. A fourth support 48 is movably connected to third support 46 and ninth 50 and tenth 52 substantially parallel arm members or molded guide members are connected to and extend from third support 46.

A fifth substantially planar panel 54 extends between and is conventionally connected to ninth 50 and tenth 52 arm members. Eleventh 56 and twelfth 58 arm members or molded guide members are slidably connected to ninth 50 and tenth 52 arm members, respectively. A sixth substantially planar panel 60 extends between and is conventionally connected to eleventh 56 and twelfth 58 arm members or molded guide members.

Thirteenth 62 and fourteenth 64 substantially parallel arm members or molded guide members are connected to and extend from fourth support 48. A seventh substantially planar panel 66 extends between and is conventionally connected to thirteenth 62 and fourteenth 64 arm members. Fifteenth 68 and sixteenth 70 arm members or molded guide members are slidably connected to thirteenth 62 and fourteenth 64 arm members, respectively, and an eighth substantially planar panel 72 extends between and is conventionally connected to fifteenth 68 and sixteenth 70 arm members.

Further in accordance with the invention, first support 18 preferably includes a first hollow elongated tube 74, and second support 20 preferably includes a first elongated rod 76 slidably positioned within and extending outwardly from first tube 74. First tube 74 defines first 78 and second 80 ends, and first rod 76 extends outwardly from second end 80. Tube 74 is preferably substantially square in outer cross-section to provide added strength, but is formed with a cylindrical threaded end 78' at first end 78 to threadably engage within a threaded opening 87 in connecting element 100. Tube 74 further defines a first elongated opening 75 extending substantially along the length of tube 74, and a first panel support 77 is conventionally connected to rod 76 and extends through first opening 75. Fifth 34 and sixth 36 arm members and third panel 38 are preferably formed as a single unit from a molded plastic material and are connected to first support 77 by a plurality of screws 81. First 22 and second 24 arm members and first panel 26 are preferably formed as a single unit from a molded plastic material and are connected to the exterior of tube 74 by a plurality of screws 83.

Assembly 6 further includes a first stop element 82, preferably made of a Nylon material, fixedly positioned within first tube 74 and adjacent to second end 80, and first stop element 82 defines a first opening 84 therein through which first rod 76 slidably extends.

Assembly 6 further includes a first slide element 86, preferably made of a Nylon material, conventionally attached to rod 76 and positioned in contacting, sliding relationship with the interior of first tube 74. First tube 74 defines a predetermined length and a first central longitudinal axis 88, and the combined lengths of stop element 82 and slide element 86 in a direction along axis 88 are preferably no less than substantially twenty five percent of the length of first tube 74 to provide stability when first rod 76 is extended from first tube 74. First rod 76 defines first 90 and second 92 ends, and slide element 86 is attached adjacent to first end 90 of first rod 76.

First 22, second 24, fifth 34 and sixth 36 arm members preferably define therein first elongated slots 22', 24', 34' and 36', respectively. Assembly 6 further preferably includes first fasteners 28', 30', 40' and 42' fastened to third 28, fourth 30, seventh 40 and eighth 42 arm members, respectively, and slidably positioned through first slots 22', 24', 34', 36', respectively, whereby second 32 and fourth 44 panels can be moved in overlapping relationship with respect to first 26 and third 38 panels, respectively. Interior surfaces 22", 24", 34" and 36" of arm members 22, 24, 34 and 36 are preferably lined with a felt material 22'", 24'", 34'", 36'", respectively, or other material having properties similar to that of felt, to enable free sliding movement between arm members 22, 24, 34, 36 and arm members 28, 30, 40, 42, respectively.

Arm members 28, 30 and panel 32; and arm members 40, 42 and panel 44 are respectively preferably formed as single units from a molded plastic material.

Fastener 10 is preferably a clamp 10' having at least a first screw 94 for holding clamp elements 13, 15 together by having first screw 94 extend through threaded openings 13', 15' in clamp elements 13, 15, respectively. Screw 94 threadably engages threaded openings 13', 15' for holding clamp elements 13, 15 together as they grasp and engage first connecting element 96. Preferably two additional screws 94' hold clamp elements 15, 31 together by having screws 94' extend through and threadably engage threaded openings 41, 43, 45 and 47 in clamp elements 15, 31. The interior surface of clamp element 31 is preferably ridged at area 23, and the upper portion of clamp element 15 is preferably ridged at area 25 to enhance grasping of mounting rod 8 as screws 94' are tightened.

In a preferred embodiment of the invention, connecting element 96 includes a substantially spherical end portion 97 which seats within concave depressions 27, 29 within clamp elements 13, 15, respectively. Depressions 27, 29 together form a substantially hemispherical cavity, and end portion 97 rotatably seats and is held within the cavity formed by depressions 27, 29, whereby first connecting element 96 can be universally rotated with respect to first fastener 10. End 99 of first connecting element 96 is preferably conventionally connected to first swivel member 14 by axially threadably engaging a threaded opening 17' in bolt 17.

Second connecting element 98 is conventionally connected to and extends from first swivel member 14. A third connecting element 100 is conventionally connected to first support 18, as previously described, and is rotatably connected to second connecting element 98. Second connecting element 98 preferably includes a substantially spherical end portion 102. Third connecting element 100 includes two separate elements 103, 105 defining concave depressions 103', 105', respectively. Depressions 103', 105' together define an interior substantially hemispherical cavity 104 for holding and slidably, rotatably receiving end portion 102 within cavity 104, whereby third connecting element 100 can be universally rotated about second connecting element 98.

Third connecting element 100 further includes a second screw 106 adjustably and threadably positioned through threaded openings 100' in connecting element 100 to enable adjustment of the force required to universally rotate third connecting element 100 about second connecting element 98.

Further in accordance with the invention, third support 46 preferably includes a second hollow elongated tube 108, and fourth support 48 preferably includes a second elongated rod 110 slidably positioned within and extending outwardly from second tube 108.

Second tube 108 defines first 112 and second 114 ends, and second rod 110 extends outwardly from second end 114 of second tube 108. Tube 108 is preferably substantially square in outer cross-section to provide added strength, but is formed with a cylindrical threaded end at end 112 to threadably engage within a threaded opening 133 in connecting element 130.

Second elongated tube 108 further defines a second elongated opening 109 extending substantially along the length of second tube 108, and a second panel support 111 is connected to second rod 110 and extends through second opening 109. Thirteenth 62 and fourteenth 64 arm members and seventh panel 66 are preferably formed as a single unit from a molded plastic material and are connected to second support 111 by screws 113. Ninth 50 and tenth 52 arm members and fifth panel 54 are preferably formed as a single unit from a molded plastic material and are connected to the exterior of tube 108 by a plurality of screws 85.

A second stop element 116, preferably made of a Nylon material, is fixedly positioned within second tube 108 adjacent to second end 114 of second tube 108, and second stop element 116 defines a second opening 118 therein through which second rod 110 slidably extends.

A second slide element 120, preferably made of a Nylon material, is conventionally attached to second rod 110 and is positioned in contacting, sliding relationship with the interior of second tube 108. Second tube 108 defines a length and a second central longitudinal axis 122, and the combined lengths of second stop element 116 and second slide element 120 in a direction along second axis 122 are preferably no less than substantially twenty-five percent of the length of second tube 108 to provide stability when second rod 110 is extended from second tube 108.

Second rod 110 defines first 124 and second 126 ends, and second slide element 120 is attached adjacent to first end 124 of second rod 110.

Ninth 50, tenth 52, thirteenth 62 and fourteenth 64 arm members preferably define therein second elongated slots 50', 52', 62', 64', respectively. Second fasteners 56', 58', 68', 70' are fastened to eleventh 56, twelfth 58, fifteenth 68 and sixteenth 70 arm members, respectively, and are slidably positioned through second slots 50', 52', 62', 64', respectively, whereby sixth and eighth panels 60, 72 can be moved in overlapping relationship with respect to fifth and seventh panels 54, 66, respectively. Interior surfaces 50", 52", 62" and 64" of arm members 50, 52, 62, and 64 are preferably lined with a felt material 50''', 52''', 62''', 64''', or other material having properties similar to that of felt, to enable free sliding movement between arm members 50, 52, 62, 64 and arm members 56, 58, 68, 70, respectively.

Arm members 56, 58 and panel 60; and arm members 68, 70 and panel 72 are respectively preferably formed as single units from a molded plastic material.

In accordance with the invention, fourth connecting element 128 is conventionally connected to and extends from second swivel member 16, and a fifth connecting element 130 is conventionally connected to third support 46, as previously described, and is rotatably connected to fourth connecting element 128.

Fourth connecting element 128 preferably includes a substantially spherical end portion 132. Fifth connecting element 130 includes two separate elements 138, 140 defining concave depressions 138', 140', respectively. Depressions 138', 140' together define an interior substantially hemispherical cavity 134 for holding and slidably, rotatably receiving end portion 132 within cavity 134, whereby fifth connecting element 130 can be universally rotated about fourth connecting element 128.

Fifth connecting element 130 further includes a third screw 136 adjustably and threadably positioned through threaded openings 130' in connecting element 130 to enable adjustment of the force required to universally rotate fifth connecting element 130 about fourth connecting element 128.

All elements of assembly 6 are preferably made of metal, except that panels 26, 32, 38, 44, 54, 60, 66 and 72 and associated arm members 22, 24, 28, 30, 34, 36, 40, 42, 50, 52, 56, 58, 62, 64, 68 and 70 are preferably made of molded plastic. The panels themselves are preferably made of tinted plastic for enhanced sun-shielding.

A first molded plastic extension 142 preferably extends from first arm member 22 to provide enhanced sun-shielding at the edge of the vehicle's windshield and adjacent to the driver's side window. Similarly, a second molded plastic extension 144 can extend from third arm member 28. Also, a third molded plastic extension 146 can extend from tenth arm member 52 and a fourth molded plastic extension 148 can extend from twelfth arm member 58 to provide enhanced sun-shielding at the edge of the vehicle's driver's side window.

In operation and use, a conventional sun visor assembly (not shown) is removed from conventional and preexisting mounting rod 8, and visor assembly 6 is connected to mounting rod 8 by clamp 10'. Alternatively, assembly 6 can be factory installed by connecting mounting rod 8 to vehicle 9 in a conventional manner. Screws 94' tighten clamp elements 15, 31 toward each other to firmly grasp mounting rod 8 between ridged surfaces 25, 23 of clamp elements 15, 31. Screw 94 is tightened to firmly grasp spherical end portion 97 within the substantially hemispherical cavity formed by depressions 27, 29 of clamp elements 13, 15, respectively.

First support 18 and third connecting element 100 can be universally rotated about spherical end portion 102 of second connecting element 98 and between an upwardly positioned stored location and a downwardly positioned operative, sun-shielding position. The tightness of second screw 106 determines the ease with which first support 18 and connecting element 100 are rotated about spherical end portion 102. The tightness of second screw 106 enables universal rotational movement of first support 18 and movement between stored and operative positions while also enabling first support 18 to remain fixed in position once it is rotated to any desired position.

Third support 46 and fifth connecting element 130 are similarly connected to spherical end portion 132 of fourth connecting element 128. Specifically, spherical end portion 132 is movably received within substantially spherical cavity 134 of fifth connecting element 130, formed by depressions 138', 140', so that fifth connecting element 130 and support 46 can be universally rotated about spherical end portion 132 of fourth connecting element 128. Third screw 136 is adjustably tightened with respect to fifth connecting element 130 and spherical end portion 132 to enable adjustment of the force required to rotate fifth connecting element 130 about spherical end portion 132. As previously described, the tightening of third screw 136 must enable universal movement of third support 46 and connecting element 130 and movement between stored and operative positions while also enabling third support 46 to remain fixed in position once it is rotated to any desired position.

When the vehicle operator wants to shield the sun's rays as they come through the windshield of the vehicle, the operator rotates first support 18 downwardly to an operative or sun-shielding position with respect to the vehicle's windshield. The area of the windshield which can be shielded from the sun's rays can be controlled by laterally extending panel 38 from panel 26 by laterally extending second support 20 from first support 18 and/or by extending one or both of panels 32, 44 downwardly from positions adjacent to panels 26, 38, respectively.

When not in use, second support 20 can be telescoped or slid within first support 18 so that panels 26, 38 are overlapping with each other, and panels 32, 44 can be raised upwardly to positions overlapping with panels 26, 38, respectively. First support 18 can then be rotated upwardly to a stored position above the vehicle's windshield so that panels 26, 32, 38 and 44 are stored in a convenient and compact position.

Shielding of the side window of the vehicle and movement of third support 46 to a stored position above the vehicle's side window can be accomplished in a similar manner by rotation of third support 46 about spherical end portion 132 of fourth connecting element 128. The area of the side window shielded from the sun's rays can be determined by laterally extending or retracting fourth support 48 with respect to third support 46, and/or by lowering or raising panels 72, 60 with respect to panels 66, 54, respectively.

The side window shielding portions of assembly 6 can be rotated by movement of second swivel member 16 so that third support 46 is positioned adjacent to and in substantially parallel relationship with first support 18 adjacent to the vehicle's windshield. Both first support 18 and third support 46 can then be rotated upwardly to their stored positions above the windshield and adjacent to the vehicle's roof. Thus, third support 46 can be rotated upwardly to a stored position above the vehicle's windshield or third support 46 can be rotated upwardly to a stored position above the vehicle's side window.

The windshield shielding portion of assembly 6 can also be rotated to a position adjacent to the vehicle's side window by rotation of first swivel member 14, first connecting element 96 and spherical end portion 97 with respect to clamp 10'. This is accomplished by rotational movement of spherical end portion 97 within depressions 27, 29 in clamp elements 13, 15. Both first support 18 and third support 46 can then be rotated upwardly to their stored positions above the side window and adjacent to the vehicle roof.

The dimensions and configurations of assembly 6 are such that first support 18 and third support 46 can be positioned adjacent to one another and in substantially parallel relationship with one another when both first support 18 and third support 46 are rotated to positions adjacent to each other by swivel 12 and when supports 18, 46 are rotated upwardly to stored positions above the vehicle's windshield or above the vehicle's side window and adjacent to the roof of the vehicle.

Arm members 28, 30, 40, 42, 56, 58, 68 and 70 are sized and fitted within arm members 22, 24, 34, 36, 50, 52, 62 and 64, respectively, and fasteners 28', 30', 40', 42', 56', 58', 68' and 70' are tightened to enable the respective arm members to be slidably movably with respect to each other while also enabling the respective arm members to remain in fixed positions with respect to each other after they have been slidably adjusted to desired position with respect to each other.

Although the invention has been described with respect to mounting adjacent to the windshield and driver's side window, it should be understood that the invention can also be mounted adjacent to the windshield and passenger's side window.

The invention in its broader aspects is not limited to the specific detail shown and described, and departures may be made from such detail without departing from the principles of the invention and without sacrificing its chief advantages.

What is claimed is:

1. A sun visor assembly (6) for attachment to a sun visor mounting rod (8) of a vehicle (9), said assembly comprising:
   a first fastener (10) for attachment to said mounting rod (8);
   a swivel assembly (12) connected to said first fastener (10), said swivel assembly (12) having first (14) and second (16) members;
   a first support (18) connected to said first member (14);
   a second support (20) movably connected to said first support (18);
   first (22) and second (24) substantially parallel arm members connected to and extending from said first support (18);
   a first substantially planar panel (26) extending between and connected to said first (22) and second (24) arm members;
   third (28) and fourth (30) arm members slidably connected to said first (22) and second (24) arm members, respectively;
   a second substantially planar panel (32) extending between and connected to said third (28) and fourth (30) arm members;
   fifth (34) and sixth (36) substantially parallel arm members connected to and extending from said second support (20);
   a third substantially planar panel (38) extending between and connected to said fifth (34) and sixth (36) arm members;
   seventh (40) and eighth (42) arm members slidably connected to said fifth (34) and sixth (36) arm members, respectively; and
   a fourth substantially planar panel (44) extending between and connected to said seventh (40) and eighth (42) arm members.

2. A sun visor assembly as in claim 1 further including:
   a third support (46) connected to said second member (16);
   a fourth support (48) movably connected to said third support (46);
   ninth (50) and tenth (52) substantially parallel arm members connected to and extending from said third support (46);
   a fifth substantially planar panel (54) extending between and connected to said ninth (50) and tenth (52) arm members;

eleventh (56) and twelfth (58) arm members slidably connected to said ninth (50) and tenth (52) arm members, respectively;

a sixth substantially planar panel (60) extending between and connected to said eleventh (56) and twelfth (58) arm members;

thirteenth (62) and fourteenth (64) substantially parallel arm members connected to and extending from said fourth support (48);

a seventh substantially planar panel (66) extending between and connected to said thirteenth (62) and fourteenth (64) arm members;

fifteenth (68) and sixteenth (70) arm members slidably connected to said thirteenth (62) and fourteenth (64) arm members, respectively; and an eighth substantially planar panel (72) extending between and connected to said fifteenth (68) and sixteenth (70) arm members.

3. A sun visor assembly as in claim 1 wherein said first support (18) includes a first hollow elongated tube (74) and wherein said second support (20) includes a first elongated rod (76) slidably positioned within and extending outwardly from said first tube (74).

4. A sun visor assembly as in claim 3 wherein said first tube (74) defines first (78) and second (80) ends and wherein said first rod (76) extends outwardly from said second end (80).

5. A sun visor assembly as in claim 4 wherein said elongated tube (74) further defines a first elongated opening (75) extending substantially along the length of said tube (74) and further including a first support (77) connected to said rod (76) and extending through said first panel opening (75).

6. A sun visor assembly as in claim 5 further including a first stop element (82) positioned within said first tube (74) and adjacent to said second end (80) and wherein said first stop element (82) defines a first opening (84) therein through which said first rod (76) slidably extends.

7. A sun visor assembly as in claim 6 further including a first slide element (86) attached to said rod (76) and positioned in contacting, sliding relationship with said first tube (74).

8. A sun visor assembly as in claim 7 wherein said first tube (74) defines a length and a first central longitudinal axis (88) and wherein the combined lengths of said stop element (82) and said slide element (86) in a direction along said axis (88) are no less than substantially twenty five percent of the length of said first tube (74) to provide stability when said first rod (76) is extended from said first tube (74).

9. A sun visor assembly as in claim 8 wherein said first rod (76) defines first (90) and second (92) ends and wherein said slide element (86) is attached adjacent to said first end (90) of said first rod (76).

10. A sun visor assembly as in claim 9 wherein said first (22), second (24), fifth (34) and sixth (36) arm members define therein first elongated slots (22', 24', 34', 36'), respectively.

11. A sun visor assembly as in claim 10 further including first fasteners (28', 301, 40', 42') fastened to said third (28), fourth (30), seventh (40) and eighth (42) arm members, respectively, and slidably positioned through said first slots (22', 24', 34', 36'), respectively, whereby said second and fourth panels (32, 44) can be moved in relationship with said first and third panels (26, 38), respectively.

12. A sun visor assembly as in claim 11 wherein said first fastener (10) is a clamp (10') having at least a first screw (94) and at least one additional screw (94').

13. A sun visor assembly as in claim 12 further including a first connecting element (96) extending between said clamp (10') and connected to said first swivel member (14).

14. A sun visor assembly as in claim 13 further including a second connecting element (98) connected to and extending from said first swivel member (14) and a third connecting element (100), connected to said first support (18) and rotatably connected to said second connecting element (98).

15. A sun visor assembly as in claim 14 wherein said second connecting element (98) includes a substantially spherical end portion (102) and wherein said third connecting element (100) defines an interior substantially spherical cavity (104) for slidably and rotatably receiving said end portion (102) within said cavity (104), whereby said third connecting element (100) can be rotated about said second connecting element (98).

16. A sun visor assembly as in claim 15 wherein said third connecting element (100) further includes a second screw (106) adjustably positioned to enable adjustment of the force required to rotate said third connecting element (100) about said second connecting element (98).

17. A sun visor assembly as in claim 16 wherein said fifth (34) and sixth (36) arm members and said third panel (38) are connected to said first rod (76).

18. A sun visor assembly as in claim 2 wherein said third support (46) includes a second hollow elongated tube (108) and wherein said fourth support (48) includes a second elongated rod (110) slidably positioned within and extending outwardly from said second tube (108).

19. A sun visor assembly as in claim 18 wherein said second tube (108) defines first (112) and second (114) ends and wherein said second rod (110) extends outwardly from said second end (114) of said second tube (108).

20. A sun visor assembly as in claim 19 wherein said second elongated tube (108) further defines a second elongated opening (109) extending substantially along the length of said second tube (108) and further including a second panel support (111) connected to said second rod (110) and extending through said second opening (109).

21. A sun visor assembly as in claim 20 further including a second stop element (116) positioned within said second tube (108) and adjacent to said second end (114) of said second tube (108) and wherein said second stop element (116) defines a second opening (118) therein through which said second rod.(110) slidably extends.

22. A sun visor assembly as in claim 21 further including a second slide element (120) attached to said second rod (110) and positioned in contacting, sliding relationship with said second tube (108).

23. A sun visor assembly as in claim 22 wherein said second tube (108) defines a length and a second central longitudinal axis (122) and wherein the combined lengths of said second stop element (116) and said second slide element (120) in a direction along said second axis (122) are no less than substantially twenty five percent of the length of said second tube (108) to provide stability when said second rod (110) is extended from said second tube (108).

24. A sun visor assembly as in claim 23 wherein said second rod (110) defines first (124) and second (126) ends and wherein said second slide element (120) is attached adjacent to said first end (124) of said second rod (110).

25. A sun visor assembly as in claim 24 wherein said ninth (50), tenth (52), thirteenth (62) and fourteenth (64) arm members define therein second elongated slots (50', 52', 62', 64'), respectively.

26. A sun visor assembly as in claim 25 further including second fasteners (56', 58' 68', 70') fastened to said eleventh (56), twelfth (58), fifteenth (68) and sixteenth (70) arm members, respectively, and slidably positioned through said second slots (SO', 52', 62', 64'), respectively, whereby said sixth and eighth panels (60, 72) can be moved in relationship with said fifth and seventh panels (54, 66), respectively.

27. A sun visor assembly as in claim 26 wherein said first fastener (10) is a clamp (10') having at least a first screw (94) and at least one additional screw (94').

28. A sun visor assembly as in claim 27 further including a first connecting element (96) extending between said clamp (10') and connected to said first swivel member (14).

29. A sun visor assembly as in claim 28 further including a fourth connecting element (128) connected to and extending from said second swivel member (16) and a fifth connecting element (130) connected to said third support (46) and rotatably connected to said fourth connecting element (128).

30. A sun visor assembly as in claim 29 wherein said fourth connecting element (128) includes a substantially spherical end portion (132) and wherein said fifth connecting element (130) defines an interior substantially spherical cavity (134) for slidably receiving said end portion (132) within said cavity (134), whereby said fifth connecting element (130) can be rotated about said fourth connecting element (128).

31. A sun visor assembly as in claim 30 wherein said fifth connecting element (130) further includes a third screw (136) adjustably positioned to enable adjustment of the force required to rotate said fifth connecting element (130) about said fourth connecting element (128).

32. A sun visor assembly as in claim 31 wherein said thirteenth (62) and fourteenth (64) arm members and said seventh panel (66) are connected to said second panel support (111).

33. A sun visor assembly as in claim 17 further including:
a third support (46) connected to said second member (16);
a fourth support (48) movably connected to said third support (46);
ninth (50) and tenth (52) substantially parallel arm members connected to and extending from said third support (46);
a fifth substantially planar panel (54) extending between and connected to said ninth (50) and tenth (52) arm members;
eleventh (56) and twelfth (58) arm members slidably connected to said ninth (50) and tenth (52) arm members, respectively;
a sixth substantially planar panel (60) extending between and connected to said eleventh (56) and twelfth (58) arm members;
thirteenth (62) and fourteenth (64) substantially parallel arm members connected to and extending from said fourth support (48);
a seventh substantially planar panel (66) extending between and connected to said thirteenth (62) and fourteenth (64) arm members;
fifteenth (68) and sixteenth (70) arm members slidably connected to said thirteenth (62) and fourteenth (64) arm members, respectively; and
an eighth substantially planar panel (72) extending between and connected to said fifteenth (68) and sixteenth (70) arm members.

34. A sun visor assembly as in claim 33 wherein said third support (46) includes a second hollow elongated tube (108) and wherein said fourth support (48) includes a second elongated rod (110) slidably positioned within and extending outwardly from said second tube (108).

35. A sun visor assembly as in claim 34 wherein said second tube (108) defines first (112) and second (114) ends and wherein said second rod (110) extends outwardly from said second end (114) of said second tube (108).

36. A sun visor assembly as in claim 35 wherein said second elongated tube (108) further defines a second elongated opening (109) extending substantially along the length of said second tube (108) and further including a second panel support (111) connected to said second rod (110) and extending through said second opening (109).

37. A sun visor assembly as in claim 36 further including a second stop element (116) positioned within said second tube (108) and adjacent to said second end (114) of said second tube (108) and wherein said second stop element (116) defines a second opening (118) therein through which said second rod (110) slidably extends.

38. A sun visor assembly as in claim 37 further including a second slide element (120) attached to said second rod (110) and positioned in contacting, sliding relationship with said second tube (108).

39. A sun visor assembly as in claim 38 wherein said second tube (108) defines a length and a second central longitudinal axis (122) and wherein the combined lengths of said second stop element (116) and said second slide element (120) in a direction along said second axis (122) are no less than substantially twenty five percent of the length of said second tube (108) to provide stability when said second rod (110) is extended from said second tube (108).

40. A sun visor assembly as in claim 39 wherein said second rod (110) defines first (124) and second (126) ends and wherein said second slide element (120) is attached adjacent to said first end (124) of said second rod (110).

41. A sun visor assembly as in claim 40 wherein said ninth (50), tenth (52), thirteenth (62) and fourteenth (64) arm members define therein second elongated slots (50', 52', 62', 64'), respectively.

42. A sun visor assembly as in claim 41 further including second fasteners (56', 58', 68', 70') fastened to said eleventh (56), twelfth (58), fifteenth (68) and sixteenth (70) arm members, respectively, and slidably positioned through said second slots (501, 52', 62', 64'), respectively, whereby said sixth and eighth panels (60, 72) can be moved in relationship with said fifth and seventh panels (54, 66), respectively.

43. A sun visor assembly as in claim 42 further including a fourth connecting element (128) connected to and extending from said second swivel member (16) and a fifth connecting element (130) connected to said third support (46) and rotatably connected to said fourth connecting element (128).

44. A sun visor assembly as in claim 43 wherein said fourth connecting element (128) includes a substantially spherical end portion (132) and wherein said fifth connecting element (130) defines an interior substantially spherical cavity (134) for slidably receiving said end portion (132) within said cavity (134), whereby said fifth connecting element (130) can be rotated about said forth connecting element (128).

45. A sun visor assembly as in claim 44 wherein said fifth connecting element (130) further includes a third screw (136) adjustably positioned to enable adjustment of the force required to rotate said fifth connecting element (130) about said fourth connecting element 128).

* * * * *